United States Patent [19]

Thomas

[11] Patent Number: 5,617,782

[45] Date of Patent: Apr. 8, 1997

[54] METHOD AND APPARATUS FOR BREAKING, SEPARATING, AND INSPECTING EGGS

[75] Inventor: Leslie P. Thomas, Brighton, Mich.

[73] Assignee: Diamond Automations, Inc., Farmington Hills, Mich.

[21] Appl. No.: 414,681

[22] Filed: Mar. 31, 1995

[51] Int. Cl.$^6$ .............................. A23J 1/09; A47J 43/14; A01K 43/00
[52] U.S. Cl. ............................... 99/500; 99/486; 99/497; 99/568
[58] Field of Search ........................ 99/484, 485, 486, 99/487, 496–500, 568; 198/779; 426/299, 490, 300, 478, 479, 480, 231

[56] References Cited

U.S. PATENT DOCUMENTS

| | | |
|---|---|---|
| 2,524,844 | 10/1950 | Smith . |
| 2,718,906 | 9/1955 | Adams et al. . |
| 2,815,055 | 12/1957 | Willsey . |
| 3,029,849 | 4/1962 | Willsey . |
| 3,082,804 | 3/1963 | Shelton . |
| 3,133,569 | 5/1964 | Shelton et al. . |
| 3,142,322 | 7/1964 | Shelton et al. . |
| 3,180,381 | 4/1965 | Shelton . |
| 3,185,194 | 5/1965 | Ellis et al. . |
| 3,190,328 | 6/1965 | Twedt et al. . |
| 3,203,458 | 8/1965 | Shelton et al. . |
| 3,417,798 | 12/1968 | Shelton . |
| 3,613,756 | 10/1971 | Snyder, Jr. et al. ............ 426/299 |
| 3,882,769 | 5/1975 | Weber et al. ................... 99/484 |
| 4,082,856 | 4/1978 | Zwiep et al. ................... 426/299 |
| 4,111,111 | 9/1978 | Willsey ........................ 99/500 |
| 4,137,837 | 2/1979 | Warren ........................ 99/500 |
| 4,137,838 | 2/1979 | Warren ........................ 99/500 |
| 4,321,864 | 3/1982 | Willsey ........................ 99/500 |
| 4,534,284 | 8/1985 | Fujimura et al. ............... 99/498 |
| 4,919,042 | 4/1990 | Rasmussen .................... 99/499 |
| 5,085,139 | 2/1992 | Pellegrinelli . |
| 5,325,768 | 7/1994 | Hazel ......................... 99/498 |
| 5,377,583 | 1/1995 | Tomosue ...................... 99/500 |
| 5,410,953 | 5/1995 | Yamashita ..................... 99/500 |
| 5,427,016 | 6/1995 | Dunckel ....................... 99/568 |
| 5,460,083 | 10/1995 | Hutchinson et al. .............. 99/484 |
| 5,483,872 | 1/1996 | Nield ......................... 99/568 |

FOREIGN PATENT DOCUMENTS

| | | |
|---|---|---|
| 2067391 | 7/1981 | United Kingdom . |
| WO92/08402 | 5/1992 | WIPO . |

*Primary Examiner*—Timothy F. Simone
*Attorney, Agent, or Firm*—Kenyon & Kenyon

[57] ABSTRACT

The invention relates to a multiple-row egg breaking and separating machine in which the egg contents and egg shells are passed adjacent one another through an inspection station at which the contents of the egg can be rejected because the shell or contents are contaminated, defective or abnormal. The present invention is particularly useful for high-speed breaking operations, yet still allows the inspector to view all the parts of the eggs for possible rejection of the egg contents. The present invention is particularly suited for automatic scanning of egg shells and contents, and eliminates possible U.S. Food and Drug Administration (FDA) objections to prior art multiple-row egg breaking machines.

7 Claims, 3 Drawing Sheets

METHOD AND APPARATUS FOR BREAKING, SEPARATING, AND INSPECTING EGGS

BACKGROUND OF THE INVENTION

1. Field of the Invention

The present invention is directed for a machine for high-speed breaking, separating, and inspection of eggs. In particular, the present invention is a machine which allows multiple rows of eggs, both egg contents and egg shells, to be inspected at the same time and in which the egg shell and contents of a particular egg are inspected adjacent one another. The invention is particularly useful for an automatic scanning device for the inspected eggs.

2. Description of the Related Art

Single-row egg breaking and separating machines are known in the prior art. Examples of such devices are shown in U.S. Pat. Nos. 2,815,055; 3,029,849; 3,082,804; 3,133,569; 3,142,322; 3,180,381; 3,185,194; 3,203,458; 3,417,798. Generally in such devices the egg shell and separated egg contents are conveyed, in a carousel-like fashion, past an egg inspection station, at which point defective, abnormal or contaminated egg contents or egg shells can be detected and the contents disposed of in a disposal bin. These devices, however, suffer from inherent limitations in the speed at which the single row of eggs can be passed through breaking, separating, inspecting and collecting stations, and are therefore not adapted for high-speed operations.

U.S. Pat. No. 2,718,906 and U.S. Pat. No. 5,085,139, assigned to Pelbo S.r.l., show machines for breaking and separating multiple rows of eggs and for conveying those eggs to an inspection station. In the device of U.S. Pat. No. 5,085,139 there is an inspection station, generally over first container 180, at which an operator or inspector can dispose of any abnormal or defective egg contents 183 by actuating a release lever 133 coupled to the egg content cup 140 corresponding to the abnormal or defective shell contents 183. However, in the device of U.S. Pat. No. 5,085,139, the egg shell and the egg contents are conveyed on separate conveyors 121, 203, such that the egg shell of an abnormal or defective egg does not travel with the egg contents 183 at the point where an operator or inspector views the egg contents for defects or abnormalities. As a result, an operator or inspector can not determine if egg contents being inspected came from an egg shell which is contaminated and which may have contaminated the egg contents either before or during shell breakage.

The United States Food and Drug Administration (FDA) has required that egg breaking machines allow an inspector or operator to view both the egg contents and egg shells corresponding to those contents at the same time. This requirement allows rejection of egg contents to be based not only on abnormal or defective egg contents but also on contamination of the egg shell with dirt, blood, or other contaminants which could effect the contents of the eggs either before or after breaking. As a result, the FDA has not approved the use of the multiple-row egg breaking and separating devices of the type shown in U.S. Pat. No. 5,085,139 because the egg shells are conveyed away from the egg contents before the inspector or operator has had the opportunity to view both for possible contamination or abnormalities.

SUMMARY OF THE INVENTION

It is an object of the present invention to provide a multiple-row egg breaking and separating machine which allows an inspector or scanning apparatus to view both the egg contents and the egg shell corresponding to those contents at the same time and at the same location. This is done by providing a single, multiple-row conveyor which contains both the egg breaker element and the egg separator element. In addition, the present invention can include an egg breaker element which can be lifted or pivoted to allow unobstructed viewing of the egg contents and the egg shells from an overhead location.

DETAILED DESCRIPTION OF THE INVENTION

Figure 1:
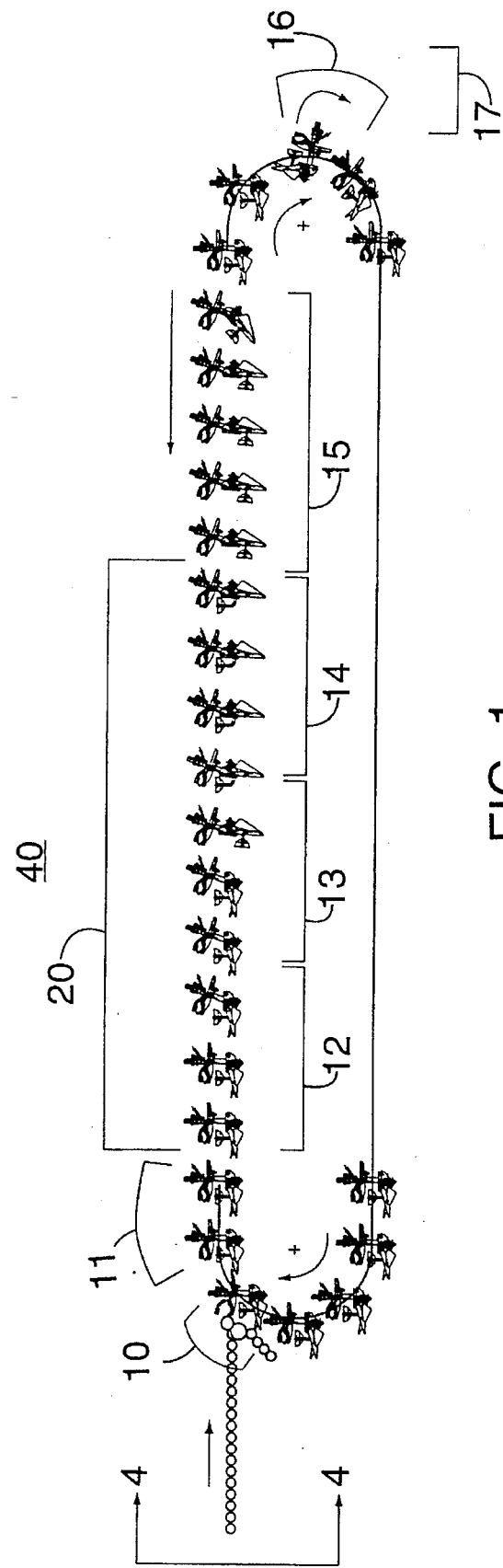
FIG. 1 is a schematic drawing of a first embodiment of the egg breaking and separating machine of the present invention.
Figure 2:
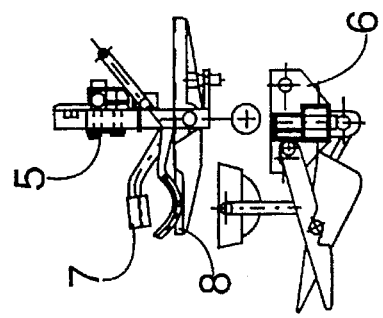
FIG. 2 is a detailed view of the transfer mechanism of the present invention, including the egg breaker and separator conveyor and spool conveyor.
Figure 2:
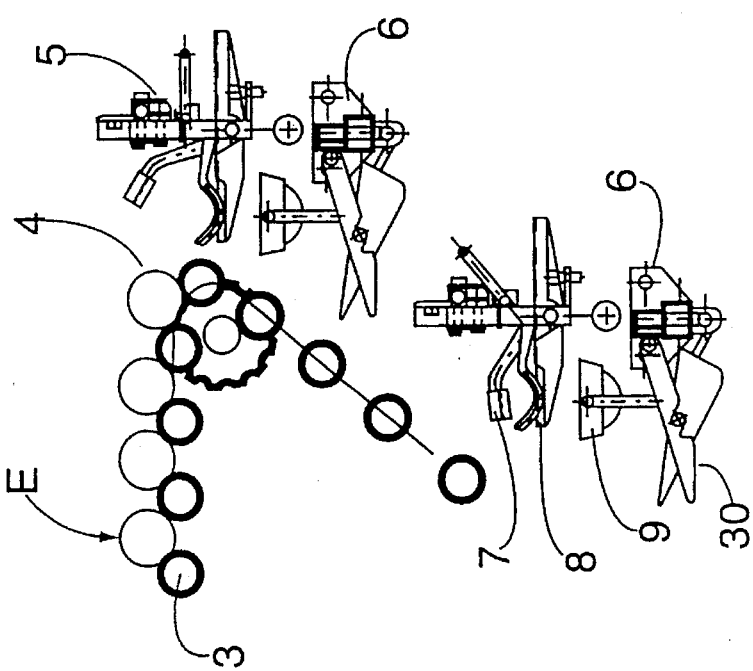
Figure 4:
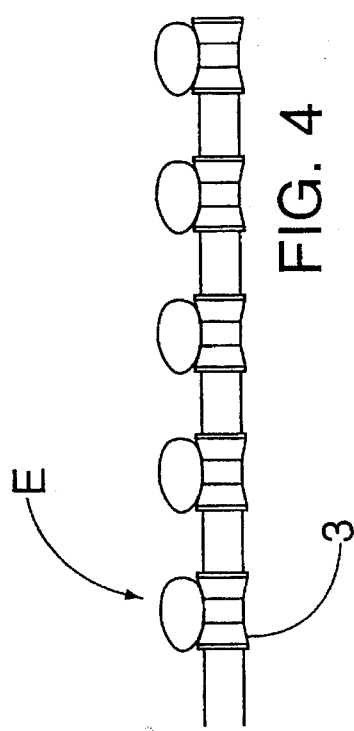
FIG. 4 is an end view of the spool conveyor of the present invention, showing multiple rows of eggs.

FIG. 1 shows a schematic representation of a first embodiment of the present invention, in which the egg breaker and separator conveyor 2 passes under an inspection station 20. The device 1 of FIG. 1 includes a spool conveyor 3 of any known conventional type, which conveys multiple rows of eggs E towards an egg breaker and separator conveyor 2. FIGS. 1–2 show a single row of eggs E on spool conveyor 2 and egg breaker and separator conveyor 2, it being understood that additional rows of eggs E, egg breaker elements 5 and egg separator elements 6 project into the page of FIGS. 1–2. FIG. 4 shows the multiple rows of eggs E on the spool conveyor 3. As shown in FIG. 2, at an end region 4 of spool conveyor 3, egg breaker elements 5 move closely adjacent end region 4 at a transfer station 10, to allow egg breaker elements 5 to receive an egg at end region 4. As will be understood from the description below, egg breaker and separator conveyor 2 contains multiple rows of egg breaker elements 5 and corresponding egg separator elements 6, such that at end region 4, a row of multiple eggs E extending across the width of spool conveyor 3 (as shown in FIG. 4) are received by a row of egg breaker elements 5 of equal number to the rows of eggs E on spool conveyor 3. As shown in FIG. 2, clamping fingers 7 are lifted as the egg breaker element 5 moves adjacent to the spool conveyor 3, and thereafter clamping fingers 7 are closed, to thereby allow the egg breaker element 5 to receive and grip the egg E ejected from the end region 4 of the spool conveyor 3. Cup halves 8 receive and cradle the egg E ejected by the spool conveyor 3.

After the eggs E have been gripped in cup halves 8 of egg breaker elements 5 by clamping fingers 7, the gripped eggs E are conveyed by egg breaker and separator conveyor 2 to an egg breaking station 11. At the egg breaking station 11, the eggs E are broken by conventional egg breaker knives 31 on egg breaker elements 5, and cup halves 8 are thereafter pivoted to cause the contents of eggs E to fall into an egg separator element 6 associated with each egg breaker element 5. Egg separator elements 6 can include an egg yolk cup 9 and an egg white receiver 30 of any known type, whereby the egg yolk of egg E is caught in egg yolk cup 9 and the egg white of egg E is drained from egg yolk cup 9 by the force of gravity into egg white receiver 30.

Figure 3:
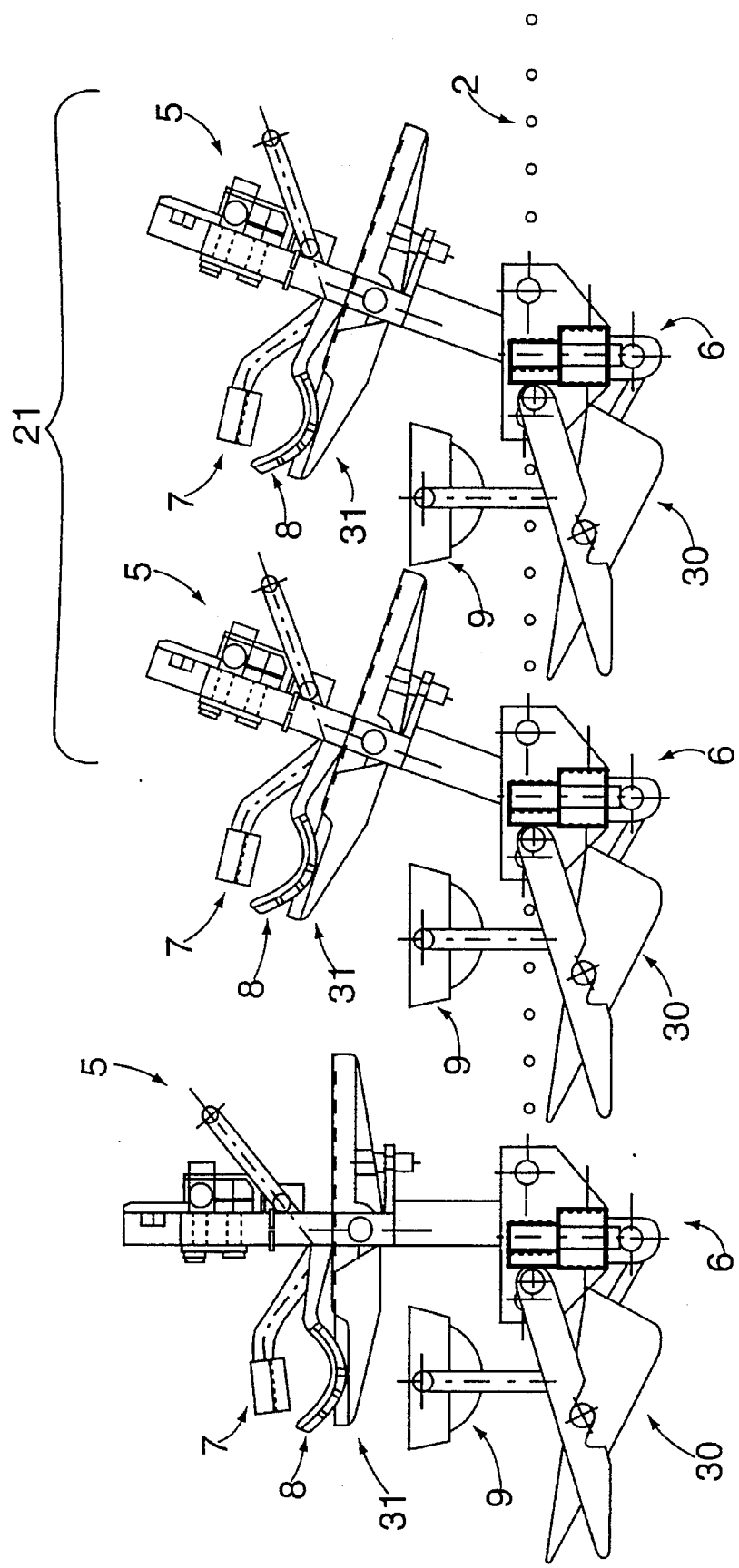
FIG. 3 is a detail view of the egg breaker and separator conveyor of the present invention.

After the eggs E on egg breaker and separator conveyor have passed through breaking station 11, the eggs E are conveyed to an inspection station 20. Inspection station allows the eggs E, including the egg shells in egg breaker element 5 and the egg contents in egg separator element 6, to be inspected from a position 40 above the egg breaker and separator conveyor 2. Inspection can be accomplished by a human inspector, or can be accomplished by suitable optoelectronic and signal-processing systems for detecting and recognizing abnormal conditions of the egg shell or egg contents. To assist in inspection of both the egg shell and the egg contents, the egg breaker element 5 may be pivoted up and away from the egg separator element 6, as shown generally at 21 in FIG. 3. In this manner, the multiple rows of egg breaker elements 5 holding egg shells and egg separator elements 6 holding egg contents may be inspected from the same location, and the egg shells are kept adjacent to the contents ejected from the egg shells. The operator or inspector may view the contents and shell of a particular egg at the same time to determine if either are contaminated, abnormal or defective, and therefore it the contents must be disposed.

The inspection station 20 includes a series of egg content receiving bins 12, 13, 14, 15, 16. The rejected egg bin 12 is the first bin at the inspection station 20. At rejected egg bin 12, an inspector or automatic scanner mechanism which detects either an egg shell or egg contents which are contaminated, abnormal or defective actuates a mechanism for pivoting egg yolk cup 9 and egg white receiver 30 to dump the contents of both of these elements into rejected egg bin 12. As a result, any egg which the inspector or automatic scanner mechanism determines is contaminated or defective has its contents collected in rejected egg bin 12 for subsequent disposal.

After eggs E on egg breaker and separator conveyor 2 are passed by rejected egg bin 12, the eggs E pass over whole egg bin 13. At whole egg bin 13, egg contents which are determined to be satisfactory and for which a whole broken egg is desired to be collected are dumped. Dumping of egg contents into whole egg bin 13 can be accomplished by an automatic mechanism—for example, if all of the eggs being processed are intended to be gathered as whole eggs—or may be done manually or in response to specific automatic signals for particular eggs in particular egg separator elements 6. Dumping of egg contents from egg separator elements 6 is accomplished in the manner already described above, by pivoting both egg yolk cup 9 and egg white receiver 30 so that the egg contents fall into whole egg bin 13 under the force of gravity.

Eggs E on egg breaker and separator conveyor 2 are next passed over egg white bin 14. At egg white bin 14, egg contents which are determined to be satisfactory and for which egg whites are desired to be separated from egg yolks are processed. Dumping of egg whites into egg white bin 14 is generally accomplished by an automatic mechanism, since all the eggs which have passed past rejected egg bin 12 and whole egg bin 13 are intended to be separated into egg whites and egg yolks. Dumping of egg whites from egg separator elements 6 into egg white bin 14 is accomplished by holding egg yolk cup 9 stationary and pivoting egg white receiver 30 so that the egg white in egg white receiver 30 falls into egg white bin 14 under the force of gravity.

Next, eggs E on egg breaker and separator conveyor 2 are passed over egg yolk bin 15. At egg yolk bin 15, egg yolks are dumped from egg separator element 6. Dumping of egg yolks into egg yolk bin 15 is generally accomplished by an automatic mechanism, which pivots egg yolk cup 9 so that the egg yolk in egg yolk cup 9 falls into egg yolk bin 15 under the force of gravity.

Finally, the egg breaker and separator conveyor 2 is passed through a shell eject station 16. At shell eject station 16, clamping fingers 7 are pivoted upward and away from the egg shells in cup halves 8, and egg breaker elements 5 are pivoted downwardly to thereby cause egg shells in egg breaker elements 5 to fall under the force of gravity into an egg shell bin 17.

In the embodiment of FIG. 1, after the egg shells are ejected at shell eject station 16, the egg breaker and separator conveyor 2 passes under the egg inspection station 20.

The present invention contemplates a number of different variations on the above-described preferred embodiment. The egg breaker elements 5 and egg separator elements 6 can be of any known type which allows breaking and separating of eggs, and which allows both elements to be mounted on a single conveyor with multiple rows. The order in which the contents of the eggs are dumped could also be different from that of the preferred embodiments, and there could be additional rejected egg bins for use by more than one operator or automatic scanning apparatus. It is to be understood that the above description is only of one preferred embodiment, and the scope of the invention is to be measured by the claims below.

I claim:

1. An apparatus for breaking and separating eggs comprising:

a first conveyor, said first conveyor conveying a plurality of rows of eggs; and a second conveyor, said conveyor comprising a plurality of rows of egg breaking and egg separating elements, said second conveyor comprising an egg breaking section, said egg breaking and egg separating elements breaking said eggs at said egg breaking section, said second conveyor further comprising an egg inspection section downstream of said egg breaking section, said egg breaking and egg separating elements retaining egg shells of said eggs and contents of said eggs adjacent one another at said inspection section, to thereby allow simultaneous inspection of an associated egg shell and egg contents of an egg.

2. The apparatus of claim 1, wherein:

said egg breaking elements pivot away from said egg separating elements at said inspection station.

3. The apparatus of claim 1, further comprising;

a rejected egg bin for receiving egg contents determined to be unacceptable.

4. The apparatus of claim 1, wherein:

said second conveyor passes under said egg inspection station downstream of said egg inspection station.

5. The apparatus of claim 1, wherein:

said egg breaking elements each comprise at least one retention finger, at least two cup halves, and at least one breaking knife.

6. The apparatus of claim 1, wherein:

said egg separating elements each comprise an egg yolk cup and an egg white receiver.

7. The apparatus of claim 6, wherein:

each said egg white receiver is capable of movement independent of movement of a corresponding egg yolk cup, and each said egg white receiver is capable of movement with said corresponding egg yolk cup.

\* \* \* \* \*